(12) United States Patent  
Chowdhury et al.

(10) Patent No.: US 6,631,136 B1
(45) Date of Patent: Oct. 7, 2003

(54) METHODS AND APPARATUS FOR DATA COMMUNICATION USING A HYBRID TRANSPORT SWITCHING PROTOCOL

(75) Inventors: Noor A. Chowdhury, Phoenix, AZ (US); Paul G. Wallner, Phoenix, AZ (US); Suresh Katukam, Chandler, AZ (US)

(73) Assignee: Hypercom Corporation, Phoenix, AZ (US)

( * ) Notice: Subject to any disclaimer, the term of this patent is extended or adjusted under 35 U.S.C. 154(b) by 0 days.

(21) Appl. No.: 09/383,714

(22) Filed: Aug. 26, 1999

Related U.S. Application Data

(60) Provisional application No. 60/097,988, filed on Aug. 26, 1998.

(51) Int. Cl.[7] .............................................. H04L 12/28
(52) U.S. Cl. .................................. 370/395.31; 709/238
(58) Field of Search ................................. 370/351, 389, 370/398, 395.3; 709/245, 238

(56) References Cited

U.S. PATENT DOCUMENTS

| | | | |
|---|---|---|---|
| 4,939,726 A | | 7/1990 | Flammer et al. |
| 5,115,433 A | | 5/1992 | Baran et al. |
| 5,243,592 A | * | 9/1993 | Perlman et al. ............ 370/252 |
| 5,265,092 A | | 11/1993 | Soloway et al. |
| 5,517,494 A | | 5/1996 | Green |
| 5,519,704 A | | 5/1996 | Farinacci et al. |
| 5,717,687 A | | 2/1998 | Minot et al. |
| 5,781,534 A | * | 7/1998 | Perlman et al. ............ 370/248 |
| 5,805,818 A | * | 9/1998 | Perlman et al. ............ 709/224 |
| 5,825,772 A | * | 10/1998 | Dobbins et al. ............ 370/396 |
| 5,872,783 A | * | 2/1999 | Chin ..................... 370/395.32 |
| 5,881,246 A | * | 3/1999 | Crawley et al. ............ 709/238 |
| 5,913,921 A | * | 6/1999 | Tosey et al. .............. 709/220 |
| 6,047,325 A | * | 4/2000 | Jain et al. ................ 709/227 |
| 6,212,185 B1 | * | 4/2001 | Steeves et al. ............ 370/392 |
| 6,400,681 B1 | * | 6/2002 | Bertin et al. .............. 370/218 |

* cited by examiner

Primary Examiner—Hassan Kizou
Assistant Examiner—Dmitry Levitan
(74) Attorney, Agent, or Firm—Snell & Wilmer LLP

(57) ABSTRACT

A data communication method enables the transfer of data having different protocols without requiring increased bandwidth in the transmission line. The system efficiently re-routes data in the event of network alterations and determines a fast and efficient way to transport data based on the then-existing network structure using link-state and distance vector techniques.

5 Claims, 10 Drawing Sheets

METHODS AND APPARATUS FOR DATA COMMUNICATION USING A HYBRID TRANSPORT SWITCHING PROTOCOL

CROSS-REFERENCE TO RELATED APPLICATIONS

This application claims the benefit of U.S. Provisional Application Serial No. 60/097,988, filed Aug. 26, 1998, hereby incorporated by reference.

BACKGROUND OF THE INVENTION

1. Technical Field

The present invention relates, generally, to data communication and, more particularly, to the transfer of data in an Integrated Enterprise Network (IEN) via a hybrid transport switching protocol which provides for dynamic rerouting of data.

2. Background Information

Many communication networks currently exist which facilitate the transmission of data from one place to another. Such networks are often designed to deliver a large amount of data in a short amount of time while minimizing power consumption, transmission errors and cost. In balancing these requirements, many known networks fail to efficiently transmit data; that is, such networks tend to be costly, slow, non-robust, and complicated.

In a typical network, data at one location must be sent via a communication channel to another location, such as a server, a data center, or the like. These communication channels, or data links, may be established through a variety of hard-wired and/or wireless schemes, e.g., fiber optic cables, twisted-pair, etc. Data may be transmitted through such links within a certain bandwidth range. For example, a network may utilize a certain bandwidth of trunk lines which has been leased from the owner, typically a telephone or communications company.

Data may be transmitted through a network in accordance with a variety of known protocols, each of which formalizes a set of conventions governing the structure of the data (e.g., TCP/IP, ATM, Frame Relay, and the like). As the number of different protocols which may be transmitted through a network increases, so does the need for greater bandwidth. The cost of leasing trunk lines increases proportionally with the amount of bandwidth required to transmit the data over the network. Thus, current communication networks are constrained between the variety of protocols which can be transmitted through the network and the cost of increased bandwidth necessary to transmit in accordance with those protocols. Therefore, a need exists for transmitting data via a number of different protocols without unnecessarily increasing the required bandwidth.

Data may be transmitted using a variety of different algorithms, such as distance vector algorithms, link-state algorithms and the like. Benefits and detriments are associated with each of these algorithms, and therefore a need exists in the industry to develop a more efficient algorithm to transmit data. Distance vector algorithms evaluate indicia of cost associated with each connection. That is, the transmission of data from one location or node to another typically includes a series of smaller connections. A distance vector algorithm enables the fast transfer of data from one node to another by virtue of the fact that it does not conduct an extensive analysis of the entire route a priori. Rather, this algorithm transmits data by focusing on one connection at a time. This algorithm may not enable quick and efficient incorporation of network changes, and thus may result transmission problems, such as infinite loops. Thus, the distance vector algorithm does not always permit reliable transfer of data.

Data may also be transmitted using link-state algorithms. Such schemes typically evaluate both the number of connections and the costs associated with each connection. Link state algorithms may utilize a routing table which contains connection data about each node, i.e., contains a listing identifying a plurality nodes and the other nodes to which each is connected. In the transfer of data from one node to another, the link state algorithm updates network changes and incorporates any changes into the routing table. Under this algorithm data may be routed less quickly in comparison to other algorithms because more processing is conducted to determine an efficient route, but problems, such as transmission problems, may be less likely to occur. In addition, a link state algorithm may require more processing power and memory to route data.

Given the problems associated with the current algorithms known in the art, a need exists for a faster and more efficient algorithm for routing or re-routing data based on the current state of a network.

SUMMARY OF THE INVENTION

Accordingly, the present invention enables the to transfer data having different protocols without requiring an increased bandwidth in the transmission line. In addition, the present invention efficiently re-routes data in the event of network alterations. The present system determines a fast and efficient way to transport data based on the then-existing network structure using link-state and distance vector techniques.

The above and other advantages of the present invention are carried out in one form by a method of routing data from a source node to a destination node in a network having a plurality of nodes, a plurality of regions and a switching element, the method comprising the steps of: associating a node address with each of said plurality of nodes; identifying a source address associated with said source node and a destination address associated with said destination node in said source node; creating a plurality of links, each link connecting two of said nodes; associating link costs with said links; creating a table in said source node identifying how said source node within one of said regions is linked to other said nodes within said one region and is linked to said regions other than said one region and identifying said link costs; exchanging data over said links between said source node and said nodes which are linked to said source node; updating said table based on said exchanged data; and routing said data from said source address to said destination address utilizing said table, said exchanged data and minimizing said link costs.

BRIEF DESCRIPTION OF THE DRAWING

A more complete understanding of the present invention may be derived by referring to the detailed description and claims when considered in connection with the Figures, wherein like reference numbers refer to like items throughout the Figures, and:

DETAILED DESCRIPTION OF PREFERRED EXEMPLARY EMBODIMENTS

In accordance with a preferred embodiment of the present invention, a hybrid transport switching protocol ("HTSP") enables the efficient transmission of data among nodes in a dynamic network utilizing a combination of link-state and distance vector principles. In this regard, the present invention may be described herein in terms of functional block components and various processing steps. It should be appreciated that such functional blocks may be realized by any number of hardware, firmware, and/or software components configured to perform the specified functions. Further, it should be noted that the present invention may employ any number of conventional techniques for data transmission, training, signal processing and conditioning, and the like. Such general techniques as well as conventional analog and digital components that may be known to those skilled in the art are not described in detail herein. Furthermore, the finction of conventional network components such as routers, switches, and the like will not be described in detail. General background information on networks and data communication can be found in a number of texts, including, for example, G. Held, *Understanding Data Communication*, 5th ED. (1996); D. Naik, *Internet Standards and Protocols* (1998); P. Loshin, *TCP/IP Clearly Explained 2d ED.* (1997); and D. MCDYSAN, *ATM Theory and Applications* (1998).

Figure 1:
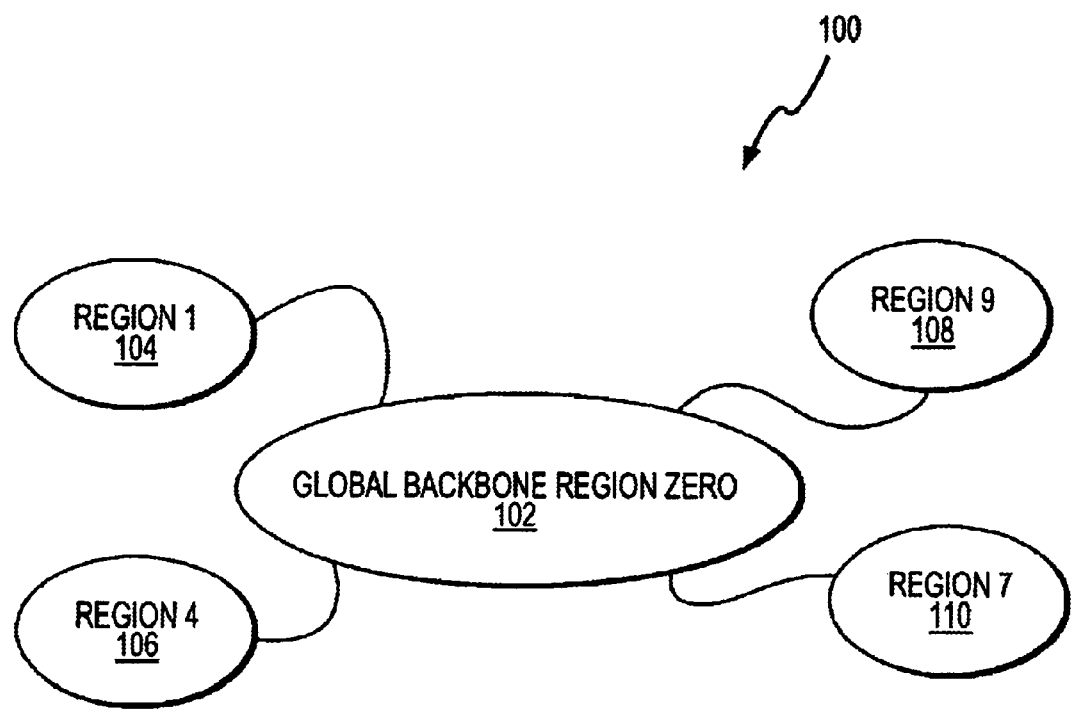
FIG. 1 shows an exemplary network having a plurality of regions connected to a backbone region.

Referring now to FIG. 1, an Integrated Enterprise Network (IEN) 100 generally consists of a global backbone region 102 connected to one or more regions 104, 106, 108, and 110. Each region preferably includes its own network management system (NMS) (described in further detail below) to manage the respective regions, and each region has an associated ID that is unique to that region within the entire IEN network 100.

The partitioning of the network into separate regions allows for the creation of a partitioned, hierarchical network structure. Depending upon the purpose and structure of a network, regions may be, for example, a country in a worldwide network, a state in a country-wide network, one office facility of a large business or any other part of a network which could benefit from regional grouping as discussed below.

Figure 2:
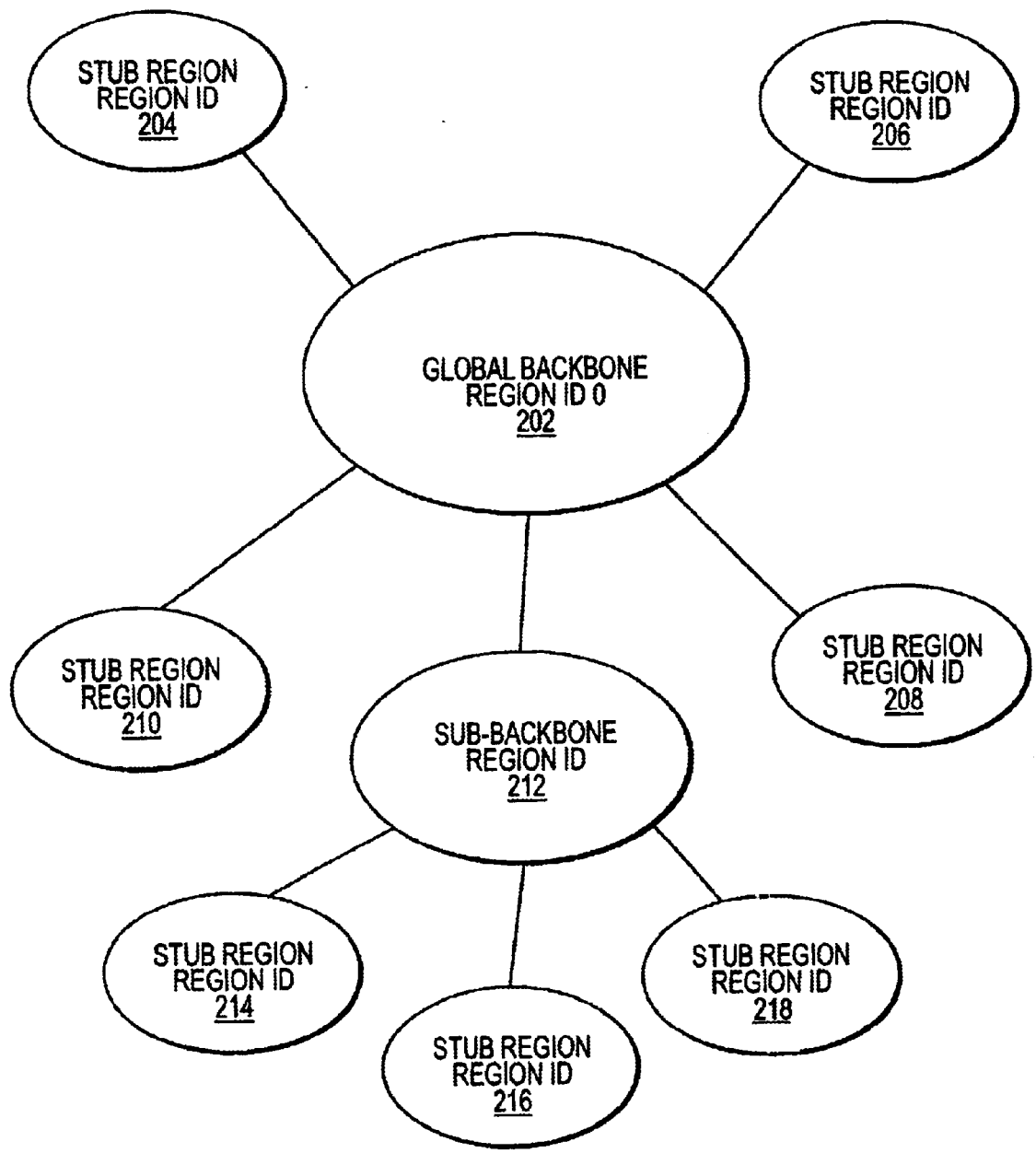
FIG. 2 shows an exemplary network having a plurality of stub regions, a sub-backbone region, and a backbone region.

More particularly, referring now to FIG. 2, an example IEN 100 useful for illustrating the present invention comprises a global backbone region 202 and a sub-backbone region 212 connected thereto. A number of stub regions (204, 210, 206, 208) are connected to backbone 202, and a number of additional stub regions (214, 216, and 218) are connected to sub-backbone 212. Each of the stub-regions effectively represent a logical grouping of branch nodes as described in further detail below.

Global backbone 202 connects all of the sub-backbones (or "regional" backbones) and any independent stub regions, providing a routing path of data from one regional backbone or independent stub region to another. As a "transit region," all traffic, including that which is 'pass through' traffic from one sub-backbone to another, may move through the global backbone. In the illustrated embodiment, there is only one global backbone region in an entire IEN network; and its ID is reserved as "zero."

Global backbone 202 may comprise any suitable combination of hardware and software, e.g., a frame relay switch or the like located, for example, within the telephone network. As is known, frame relay is a fast packet-switching technology that provides virtual circuit service relaying using variable size frames.

Each sub-backbone region may connect multiple stub regions, providing the routing path from one stub region to another. Sub-backbones share many of the same properties of global backbone region 202, but have some other distinguishing properties Another important distinction is the ability for each sub-backbone region to have its own network management system independent of the other sub-backbone regions.

Figure 3:
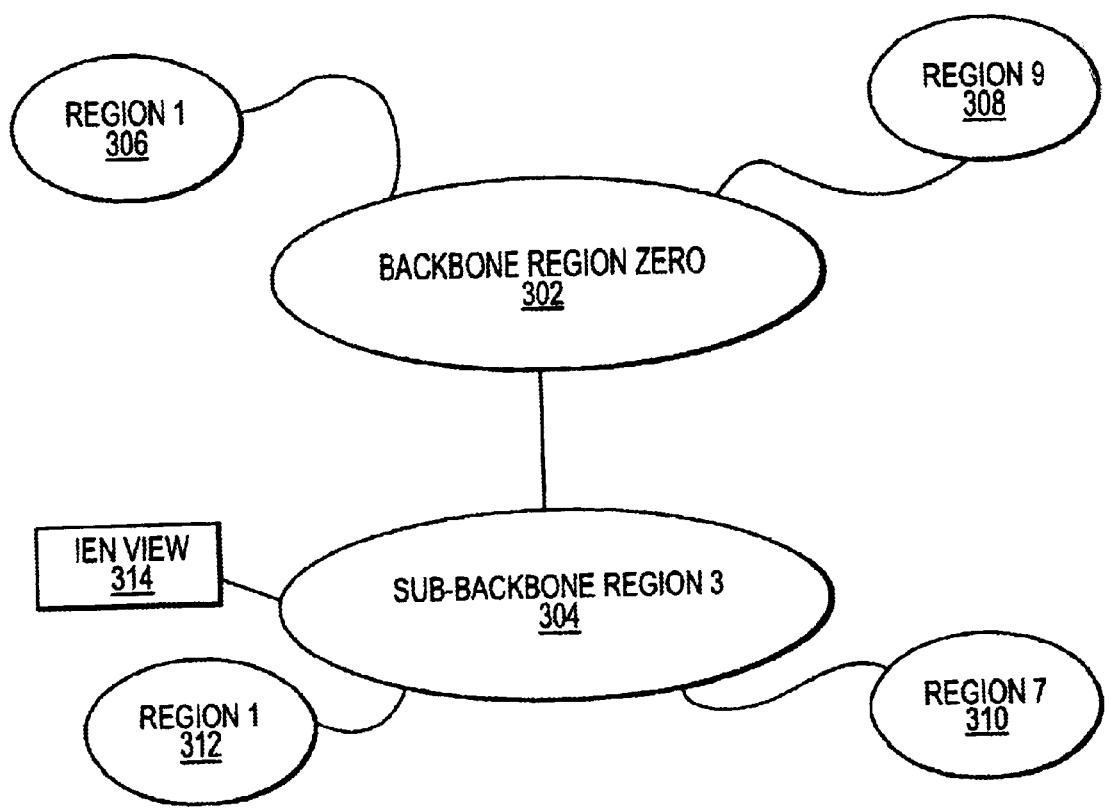
FIG. 3 shows an exemplary network with an IENView node.

Multiple regions can be grouped together and connected to a sub-backbone region which itself has a connection to a global backbone region. These regions may have one or more IENView management systems installed to manage these regions. That is, referring now to FIG. 3, IENView system 314 belongs to Region 3 (sub-backbone 304) and thus manages Regions 3, 4, and 7 (304, 312, and 310, respectively). The backbone region (302) and associated stub regions (306 and 308) may be managed by one or more additional IENView systems (not shown).

It will be appreciated that this architecture limits changes in a region to itself, and does not cause any unexpected changes in other regions. If there is a network change (e.g., a node lost or a link failure) in Region 4 (312), then the change is limited only to region 4. The nodes' broadcast-traffic does not flow through backbone region 302, but through sub-backbone region 304.

Figure 4:
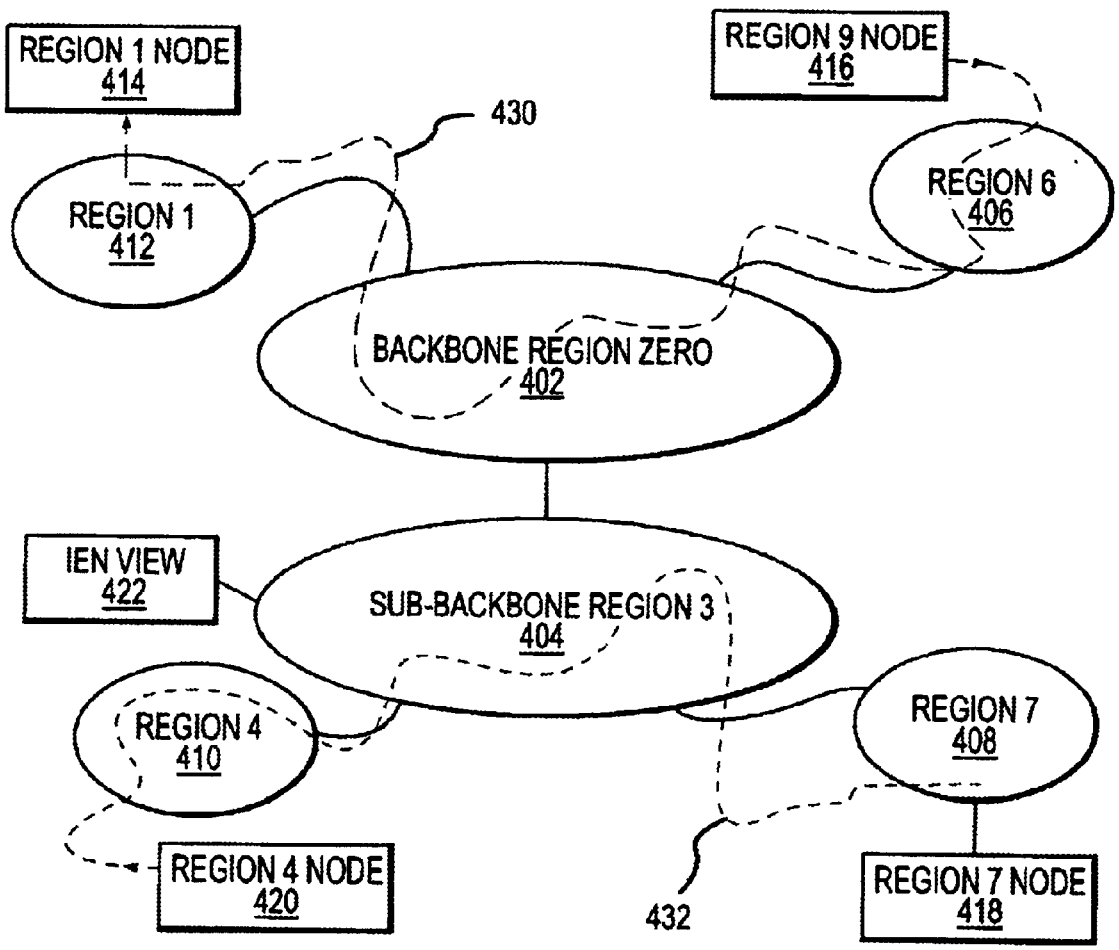
FIG. 4 shows an exemplary network with illustrative communication paths.

If a node needs to communicate to a node in another region, the communication path may traverse a sub-backbone region and/or the backbone region. That is, referring now to FIG. 4, a node 416 within region 406 may wish to communicate with node 414 within region 412 The communication path 430 then extends from node 416, through region 406, through backbone region 402, then through region 412 and ultimately to node 414. Likewise, communication from node 420 to node 418 traverses region 410, sub-backbone 404, and region 408.

Transit Regions

A transit region connects multiple regions together and preferably has knowledge of all regions to which it can establish a connection. In that regard, a transit region suitably has multiple exit points to reach multiple regions; e.g., it may connect to multiple stub regions in a global backbone region such that all the information regarding other regions will flow through this region. Similarly, traffic for other regions may be routed through this region. Transit regions provide connectivity between regions, and allow routers in their region to make better routing decisions.

In FIG. 2, for example, if a node in Region 204 must communicate to a node in Region 206, the communication path passes through the Backbone Region 202. If a node in Region 214 needs to communicate to a node in Region 218, the path goes through Sub-Backbone Region 213. Region 212 and Region 202 (the backbone) are considered transit regions because the traffic from one region to another region goes through these regions. Transit nodes preferably have multiple transit routing ports or entry/exit points that allow traffic to pass through. These nodes may also contain user ports, which terminate traffic that is destined for that node.

IEN Nodes

Figure 5:
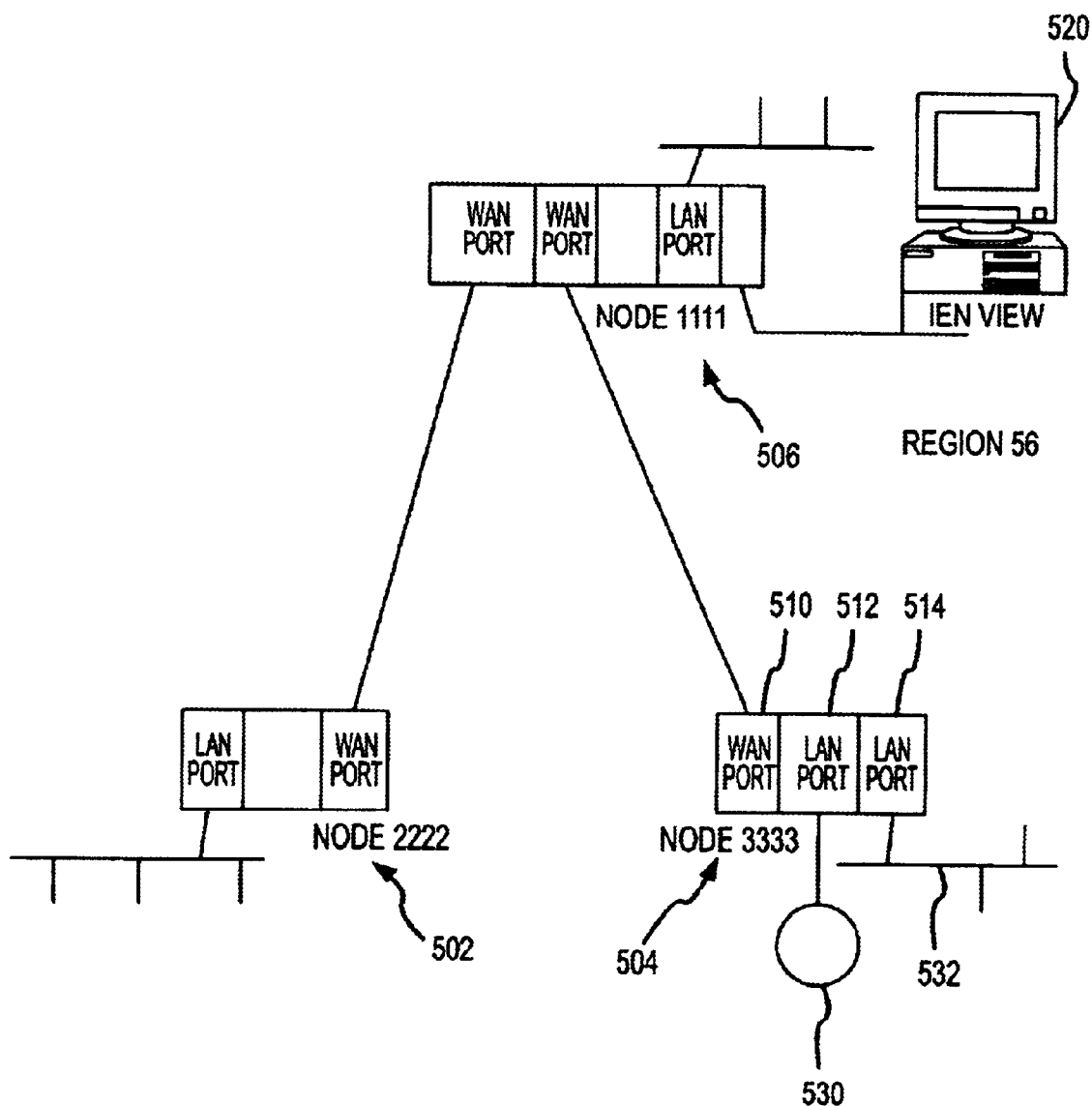
FIG. 5 shows an exemplary node topology.

Each IEN node may consist of various types of ports and interface types, each of which performs its respective routing function. Referring now to FIG. 5, Nodes 502 and 504 are stub nodes, and Node 506 is a transit node providing communication between the two stub nodes 502 and 504. Each node preferably includes multiple ports (e.g., ports 510, 512, and 514 associated with node 504) and may interface with various local area networks (LANs) (e.g., networks 530 and 532).

An IEN preferably contains at least one IENView node 520. Effectively, these nodes are workstations that are both connected to the network and running the IENView network management software or other appropriate network management software. As IENView nodes have the properties of stub nodes, network traffic is not routed through them. While the phrase "IENView" may be used throughout this application, it will be understood that any suitable combination of hardware and software capable of monitoring the network as described below may be employed.

Port Types

IEN transit ports are ports on which the router participates in database exchange with its neighbors on the interface. Transit ports also send a database learned from this interface onto the bus (i.e., the workstation's communication bus) and other interfaces. It indicates that it is connected to a transit node in its "hello" message (described below) to neighbors on the interface. When a transit port resides in a node, user applications in the node can make a better decision as to which router to select for its traffic. Transit ports provide connectivity between two networks, and usually reside in nodes with multiple exit points.

IEN stub ports are ports for which the router advertises only the default route on the bus and no database on the interface. The port indicates that it is connected to a stub node in its hello message to its neighbors on the interface. If it receives a database from any neighbor on the interface, it ignores it.

IEN user ports are ports that provide both end-user data functions and the interface that connects external equipment to IEN nodes. User ports are typically destinations for traffic in the IEN network, and play a passive role in the HTSP routing protocol. Because they are end-points for data, and not routing paths, they listen to the network routing updates, but do not advertise any of those updates. Generally, the user port does not send any of its databases or "hellos" on the user interface or on the bus.

Concentrator Nodes

Concentrator nodes contain routers that have only concentrator and user ports. The traffic flows into the node and out of the node but not through the node. Routers in these nodes can make intelligent decisions as to which path to choose. However, routing ports in other nodes cannot take a path through this node to reach another node.

IEN concentrator ports are ports for which the router receives a database from its neighbors and sends it on the bus. It receives the databases from other routers on the bus, but does not send the database on this interface. Neighbors will not observe a difference between this port and a transit port. The advantages of a concentrator port are: (1) No database information is sent on the interface that is learned from other interfaces; (2) Traffic that is not destined to the node does not go through the node; (3) If a broadcast is received on that interface, it is sent on the bus. It will not be picked up any other router and sent out to any other node; and (4) Each port (including the node with only user ports) can make a better choice to decide which router to use to reach the destination.Concentrator ports usually reside in nodes with multiple out-going interfaces, wherein each router in the node preferably makes an intelligent decision about the next hop.

HTSP Protocol

As described briefly above, the various regions, ports, and nodes that comprise the IEN network work in conjunction with a predefined protocol—i.e., the Hybrid Transit Switching Protocol (HTSP)—in order to achieve the objects of this invention. The details of such a protocol will now be described in detail. It will be appreciated, however, that the invention is not so limited, and that numerous variations, additions, deletions, and other changes to the protocol exist which would nevertheless fall within the scope of the present invention.

Addressing

In a preferred embodiment, HTSP uses a 32-bit addressing scheme. The 32 bits are divided into three parts: (a) "Regions," which consist of logical groupings of nodes; (b) "nodes," which are physical groupings of IEN ports; and (c) "ports," which provide physical interfaces to the IEN nodes. An example address is shown in Table 1 below.

TABLE 1

Sample HTSP Addressing Scheme

| 05 | 0051 | 02 |
|---|---|---|
| Region = 0 | Node = 0051 | Port = 02 |

Taken together, the sample addressing scheme shown in Table 1 represents the HTSP address 05-0051-02. In one embodiment, 0xFF (Hex) is reserved for the broadcast address for regions and ports, while 0xFFFF is reserved for the broadcast address for nodes. That is, 0xFF and 0xFFFF are not valid addresses for regions, nodes, bus addresses, or ports. Furthermore, 0xFE is reserved for multi-cast address, and is not valid for the regions, and Node 0000 is invalid.

Routing Elements

The efficient operation of HTSP combines key principles from the distance vector and link state algorithms. In general, routing is the task of moving information along a path from a sender to a desired destination. In the IEN network, the primary focus is on finding and utilizing the most efficient intermediate routers between a sender and a destination. As long as a given message remains in a node, it is routed according to the port ID of the address. However, when messages are routed from a sender in one node to a destination in a different node, they must pass through the routers (and regions) that connect those nodes. Furthermore, if those nodes are not adjacent, the message may pass through several intervening nodes, and the routers connecting them.

The algorithms that are incorporated into the illustrated HTSP routing mechanism are (1) Distance Vector (Split Horizon, Reverse Poison and triggered Updates); and (2) Link State (Hello Protocol, Database Requests and Responses, Region Border Node), both of which will be discussed below.

Distance Vector

Distance vector algorithms are based upon the exchange of minimal information, and therefore involve two basic considerations: lowest cost and fewest hops. Such algorithms are based on the principle that it is possible to compute optimal routes when the only information exchanged is the list of these distances (costs and hops).

The distance metric may encapsulate a variety of indicia, e.g., time delay in getting messages to the entity, the dollar cost of sending messages to that entity, and the like. In a preferred embodiment, HTSP equates distance with link cost and hops.

The link cost is a scaled value based upon the speed of the link connecting two entities together. The cost of the link is inversely proportional to the speed of the link. Thus, slower links have higher costs than faster links.

Within HTSP, each router that participates in the routing stores information about all of the region border nodes and destinations within its region. Generally, this information is stored on a node-by-node basis information about all ports in a given node is summarized into one entry. More particularly, each entry is preferably divided into three parts: the address of the destination node; the address of the next hop to that destination; and a metric (or distance) that includes costs and hops.

During operation, the distance information is used to compute the best path to any particular node. More specifically, to calculate the optimal route to a destination node, every node that participates in the HTSP routing protocol preferably adheres to the following procedure:

Step 1: Create and maintain a table of all possible destinations within the region and all Region Border Nodes that provide routes to the other regions. Each entry includes the cost to get to the respective destination, and the next hop on the route to that destination.

Step 2: Periodically send a routing update to every adjacent Node. This update includes all of the information from the routing table described in Step 1.

Step 3: When a routing update arrives from an adjacent Node, update the table from Step 1 as follows. First, calculate the update's distance by adding the cost of the port or interface from which the routing update came. Compare this cost with the existing data base entries. If the distance is less than the existing database distances, then learn the new route and distance.

In practice, nodes and lines often fail, then return to service when operational. This causes changes in the network topology and can lead to network instability. HTSP deals with these issues by modifying the distance vector algorithm slightly and by employing various stabilizing strategies, such as Trigger Updates and the Hello Protocol.

In HTSP, the distance vector algorithm has been modified to 'time out' routes in its database if no new updates for that route are received within a given time period. For example, in the illustrated embodiment, every Node sends a database update every 30 seconds to all of its neighbors. If a Node does not hear the same database advertisement for 3*30 seconds, then the Node assumes that the entry is unavailable.

Split Horizon and Reverse Poison

The present invention preferably employs a scheme referred to as "Split Horizon." Split horizon is a scheme used to avoid problems caused by loops in the network topology. HTSP preferably uses a form of split horizon known as "Simple Split Horizon," which simply omits routes learned from one's port in its updates sent on that port.

Furthermore, whenever there is a change in the network (e.g. when a node or link becomes non-operational), all of the routers in the network preferably converge in order to prevent sending messages to non-existing destinations or on non-existing paths. Whenever a connection to a neighbor goes down, or the neighbor itself goes down, the router preferably sends out a database update with a maximum hop value. All of the neighbors send this update to their neighbors without checking the hop value. Once every Router receives it, the entire region converges to a particular metric, e.g., sixteen, for the lost node or path.

Since sixteen is the maximum hop value, the advertisement of a route with this value will, by definition, make that route the most expensive. Thus, the path is "poisoned", and the HTSP Routers will delete this entry from their databases and learn a new, cheaper path in the next update.

Triggered Updates

While Split Horizon prevents any routing loops between two HTSP Routers, it is still possible to form some routing loops that lead to slow convergence. "Triggered Updates" is a scheme to help speed up the convergence for the cases in which Split Horizon is insufficient. With Triggered Updates, the HTSP router sends its database update immediately following a triggering event (e.g., loss of physical or logical links), rather than waiting for a scheduled time interval.

Hello Protocol

The Hello Protocol is a scheme derived from link-state routing. It is a relatively simple protocol that is used to generate triggered updates and improve convergence time by causing the Router to send a periodic 'hello' to all of its neighbors while simultaneously listening for a 'hello' from those neighbors. Since hello messages are very small, they are exchanged more frequently than the database updates (about every 1–10 seconds ), thus saving bandwidth on the wide-area network (WAN) links. The hello messages can then be used to determine if the links have changed state. When a Router stops receiving a hello from one of its neighbors, a "triggered update" occurs.

Hello messages also carry valuable information about the router and the node from which the hello messages are received. This information includes, for example, the link cost as advertised by the neighbor, and the node ID and type of the neighbor. This information also includes the region and node type to which the router belongs. It also includes the hello and database update intervals.

Sub-Region Border Node

A sub-region border node is a node with an interface that belongs to two different regions with one of the two regions being other than a backbone region. The bus interface of the node belongs to one region and the line side of the node belongs to another region. The bus interface of the node could be a stub region or it could be a transit region. The router advertises IENView database entries that are learned from one region to another region.

Region Border Node (RBN)

The region border node is HTSP's scheme for allowing multiple regions running distance vector algorithms to be networked together. Although routing is most commonly based on information about nodes, it is necessary to keep track of routes to regions (in global and sub-backbones), because routes to regions have an associated Region Border Node. When it is necessary for a message to go to other regions, a node locates a Region Border Node that can take the message to the other region, which then forwards it to that RBN. There can be a default region border node in a region that takes a message to every other region. The HTSP distinguishes between a route to a node and a route to a Region Border node in its database exchange message.

Database Update Messages

An HTSP Database Update Message is sent by an HTSP Router to each of its neighbors in order to keep them informed of all of the destinations which can be reached through that Router. The database update message contains a list of the nodes in the region as well as the Region Border Nodes. Each entry has a "distance" associated with it. Additionally, the Region Border Node entries provide the network summarization of all of the nodes outside the region.

Figure 6:
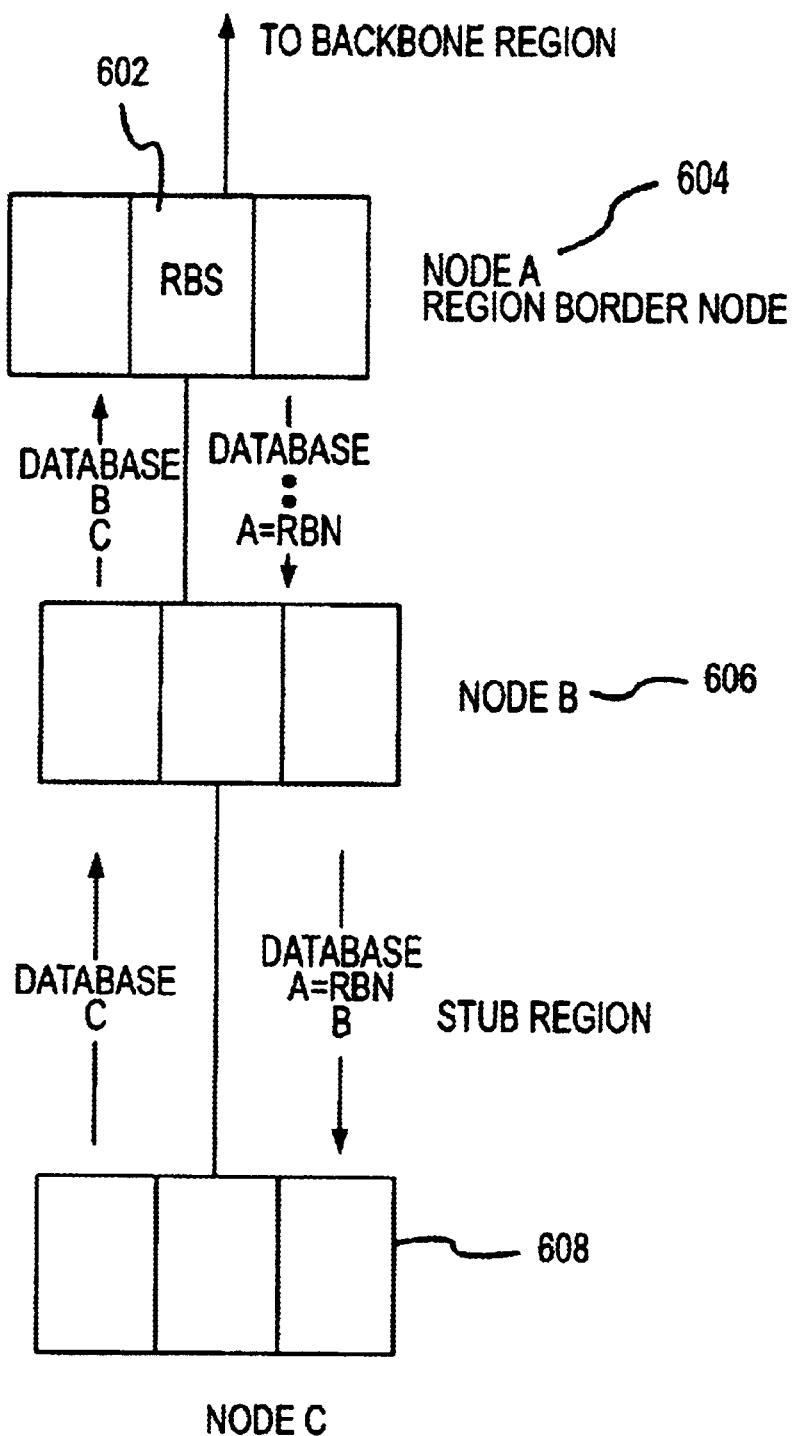
FIG. 6 shows an exemplary node topology illustrating the use of region border nodes.

Referring now to FIG. 6, RBS 602 is a Region Border Node port in node A (604), which is connected to a backbone region. All of the switches in this stub region need to know only the existence of RBS 602 (in this case node A). When the Routers in node A advertise their database entries to their neighbors in node B (606) and node C (608), this entry also indicates that node A is a region border node. Switches in node B and node C make a special note of the region border node and use this entry whenever they need to route a packet to other regions. No information about other regions is advertised in this region since this region contains only exit point. As illustrated, this is a stub region, and, because the database entries for the network outside of this region have been summarized into region border node entries, changes in the network topology in those other regions do not affect any of the Switches in this region.

In the IEN network, there are three primary types of database exchanges: database exchange within a regional backbone; database exchange within a stub region; and database exchange between the region border switches that connect the regional backbone to the stub regions.

Figure 7:
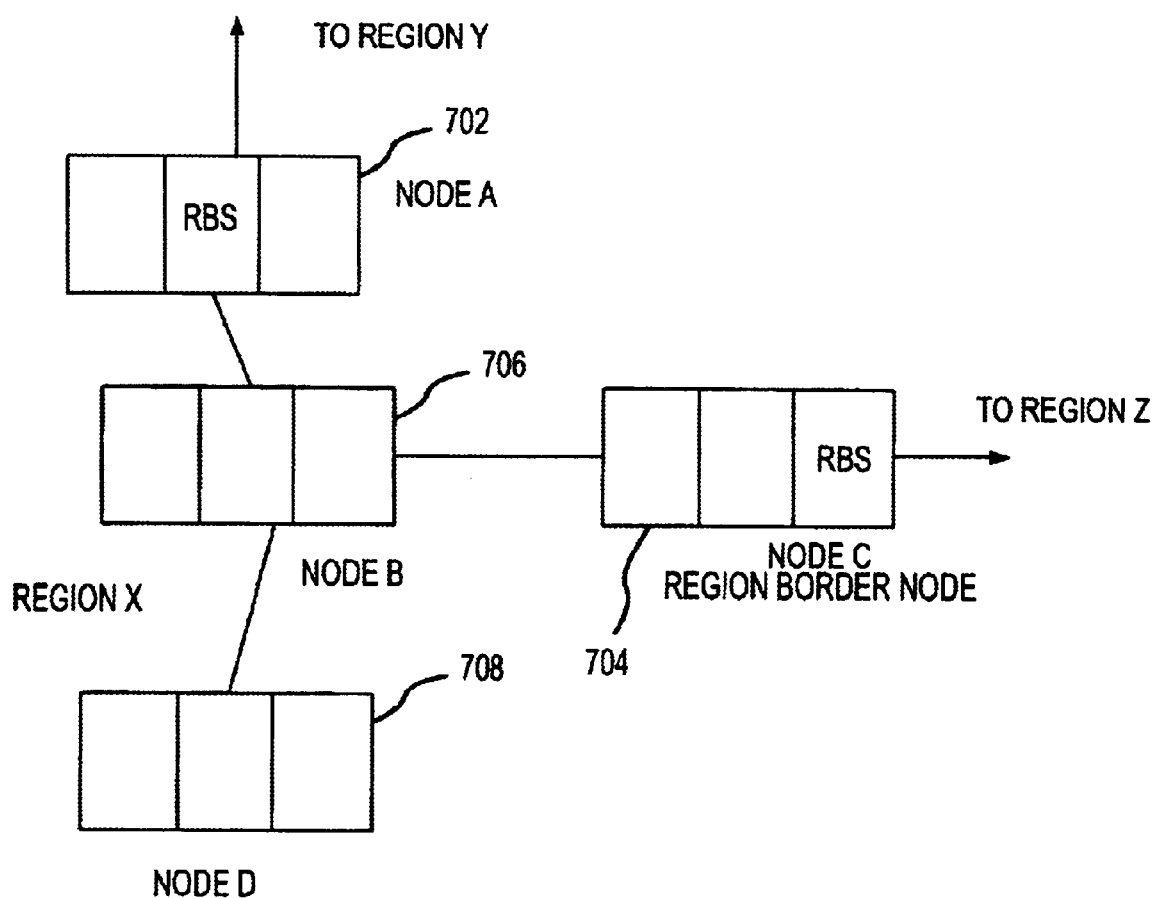
FIG. 7 shows an exemplary node topology illustrating the use of region border nodes to communicate with two separate regions.

Consider first the database exchange within a sub-backbone (FIG. 7), comprising region border nodes 702 and 704. This exchange will contain node entries of the region and the region border node entries. Thus, from the perspective of the nodes in the regional backbone, the entire network has been summarized into fewer entries, yet still provides all of the information necessary for the HTSP Switches within the region to choose the best routes for messages flowing both within the region and outside the region.

Figure 8:
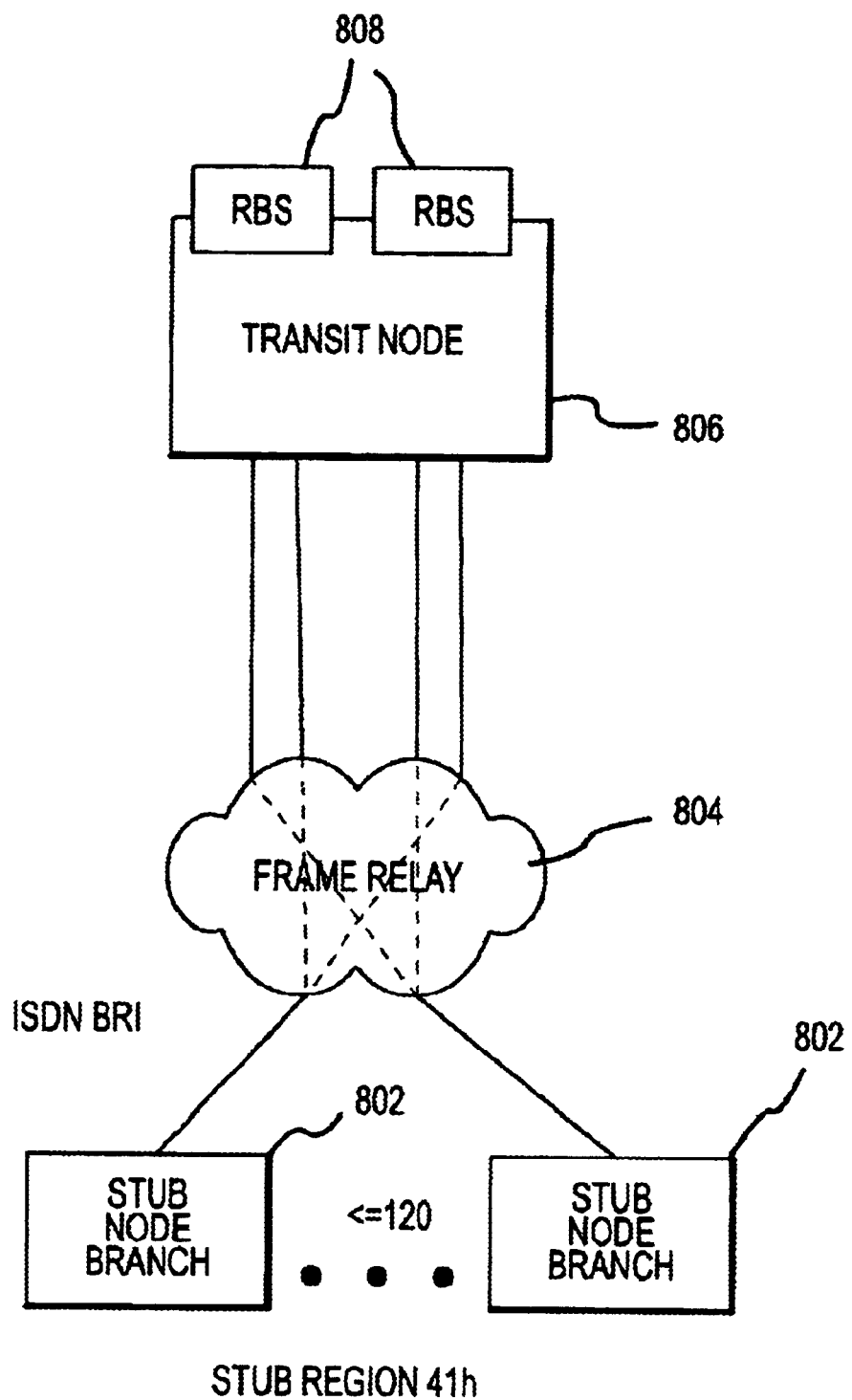
FIG. 8 shows an exemplary transit node with stub node branches and frame relay cloud.

Next, consider the database exchange within a stub region (FIG. 8) comprising a transit node 806 having RBSs 808 associated therewith, network 804, and stub nodes 802. In this case, each database exchange message from the region's transit node 806 contains (depending upon the size of the region) node entries and one (1) region border node entry. Moving in the opposite direction, the database exchange message from a stub node 802 to the transit node 806 will contain, in this embodiment, only one (1) entry: itself. By using region border switches, the entire network has been summarized into very few entries, yet still contains the information necessary to use all of the principles of the HTSP routing algorithm.

Figure 9:
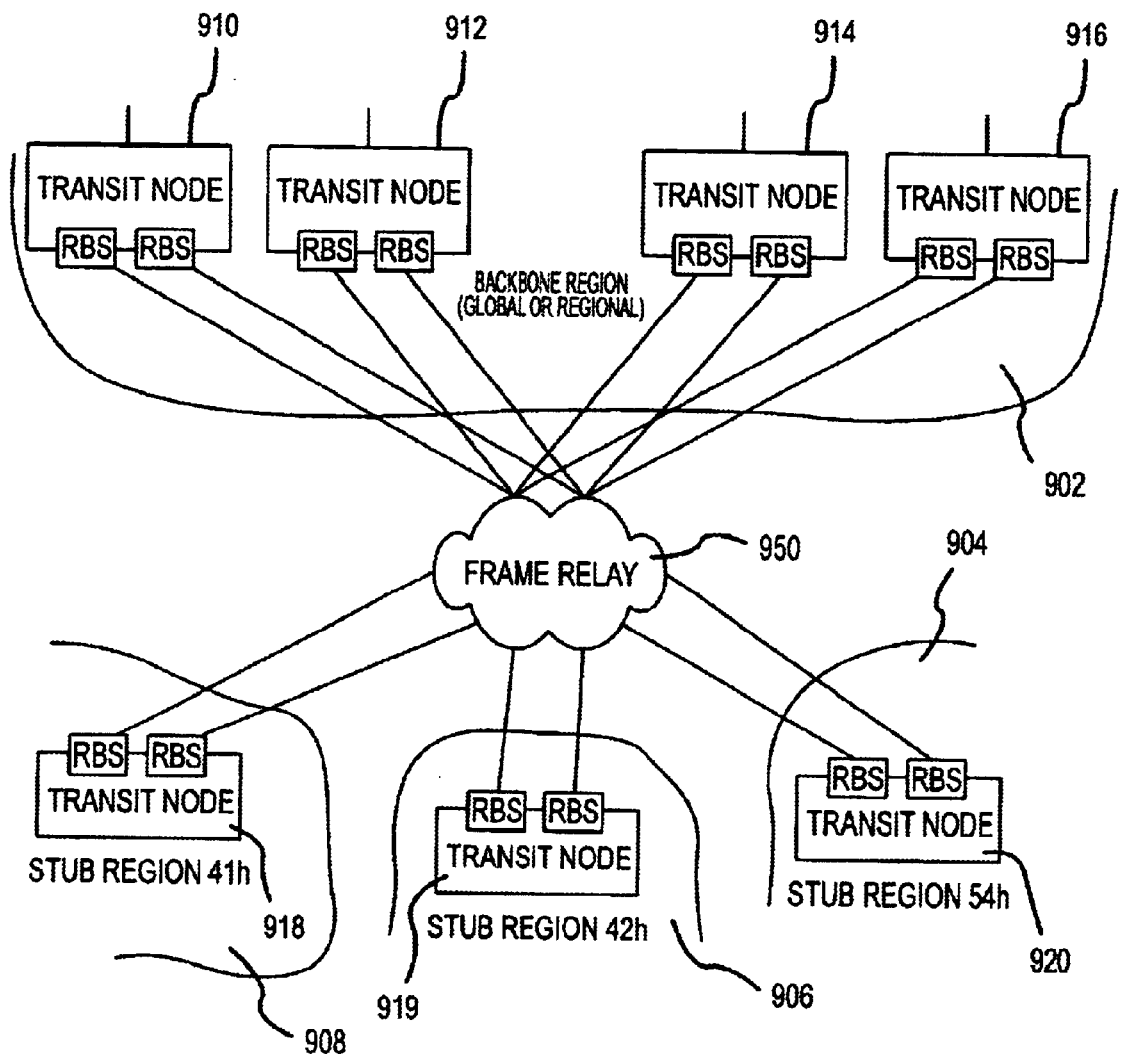
FIG. 9 shows an exemplary network illustrating the use of region border nodes in inter-regional communication.

The final case to be considered is database exchange between the Region Border Switches (FIG. 9). In this case, the database exchange messages from the stub region's RBSs (e.g., within stub regions 908, 906, and 904) will contain one region border node entry each—i.e., their own nodes' (918. 919, and 920) addresses, while the database exchange messages from RBSs within backbone region 902 will contain stub RBNs and region border node entries. Again, this highlights the power and benefits of using the region concept to summarize a large network into a few entries.

Hello Messages

Hello Messages, as explained earlier, are used by the Hello Protocol. In a preferred embodiment, these messages contain the HTSP node address of the sender and a value representing the sender's link cost. This information also includes the region and node type to which the router belongs. It also includes the hello and database update intervals.

DNCP

The DNCP (Dynamic Node ID Configuration protocol) message is issued by a port and is used by the HTSP protocol to learn its HTSP address from the network management system An HTSP Router sends a DNCP message as a broadcast, requesting its HTSP address. The DNCP contains the port's serial number, which uniquely identifies the port in IENView's database. IENView responds to the request wit a DNCP response message containing the port's Region and Node addresses and the node and region type. The HTSP protocol uses the concept of DNCP helpers to minimize the broadcasts required to accomplish this task.

Broadcasts

In the event that a switch wants to send a message to many ports at once, the HTSP protocol uses Broadcast Messages. The broadcast may be to all ports in the network or to some subset of the network. HTSP allows broadcasts to all ports of a region, or to all ports of a specific node, thus allowing a direct node broadcast and a directed region broadcast. However, in a preferred embodiment, HTSP does not allow a message to be sent to every port in every region; such broadcasts can induce broadcast storms in a global network. Broadcast Messages preferably contain a special routing header with fields to prevent broadcast storms, loops, multiplication, and the like.

In the illustrated embodiment, it is possible for a broadcast message with a FF-FFFF-FF address to be sent to all the addresses in the sub-backbone region and its associated stub regions, but not into the global backbone region. The interfaces between the sub-backbone and global backbone regions block or filter the FF-FFFF-FF broadcast from getting out of the sub-backbone region.

Trace Route Header

Each broadcast message preferably contains a field called the Trace Route Header. This Trace Route Header contains a list of the nodes through which the message has passed. As the broadcast message traverses the network, each HTSP Switch port places its node address in this field. When an HTSP Switch port receives a broadcast message, it queries whether its node ID is already present in the list. If so, it discards the broadcast message. This prevents the same message from passing through a node repeatedly.

Hop Count (TTL)

Each broadcast message preferably contains a hop count field or Time To Live (TTL) field. This field is normally set to reasonable value, e.g., sixteen, to indicate that, at most, the broadcast message can traverse 16 nodes (this is the max hop count). When an HTSP Switch port receives a broadcast message, it decreases the hop count by one. If the hop count reaches zero, the message is discarded. Note that the Hop Count field is a configurable option through IENView; it may be increased or decreased to fit the particular needs of a network.

Network Routing

The above network requires two different types of HTSP routing scenarios to provide any-to-any connectivity. The two types are routing within the same region (intra-region) and routing between two different regions (inter-region). A brief overview of how a message is routed with HTSP for each of these scenarios follows. Each of these discussions explains how the HTSP routing algorithm, along with the Region Border node concept, provides a fast and efficient method for transporting the message to its final destination.

HTSP routing ports use the distance vector algorithm for routing of messages within their own regions To route a message, an HTSP router must select an interface and the next hop in the path to the final destination. The selection of the next hop is only necessary when the interface is a multi-access interface such as Frame Relay, Token Wing, or the internal bus of an IEN node.

With respect to intra-region routing, when an HTSP router port receives a message, it first checks the message to see if it is addressed for its own region. If so, then it searches its database for an entry which contains the destination node ID. This matching database entry contains the interface and the next hop the message must take. The router then forwards the message to the respective interface and IEN port on that interface. This process of forwarding the message to the next hop may be repeated multiple times until the message reaches it final destination node. When the message reaches its destination node, the switch recognizes that the message is addressed for this node and then forwards via the nodes internal bus to the destination port.

In a Multi-Region network environment, Region-to-Region communication goes through a Backbone or Sub-Backbone Region. As described above, the node in a region which is an interface to the backbone region is called region border node, and the interface port processor within the RBN which connects to the backbone region is called the region border switch (RBS).

Figure 10:
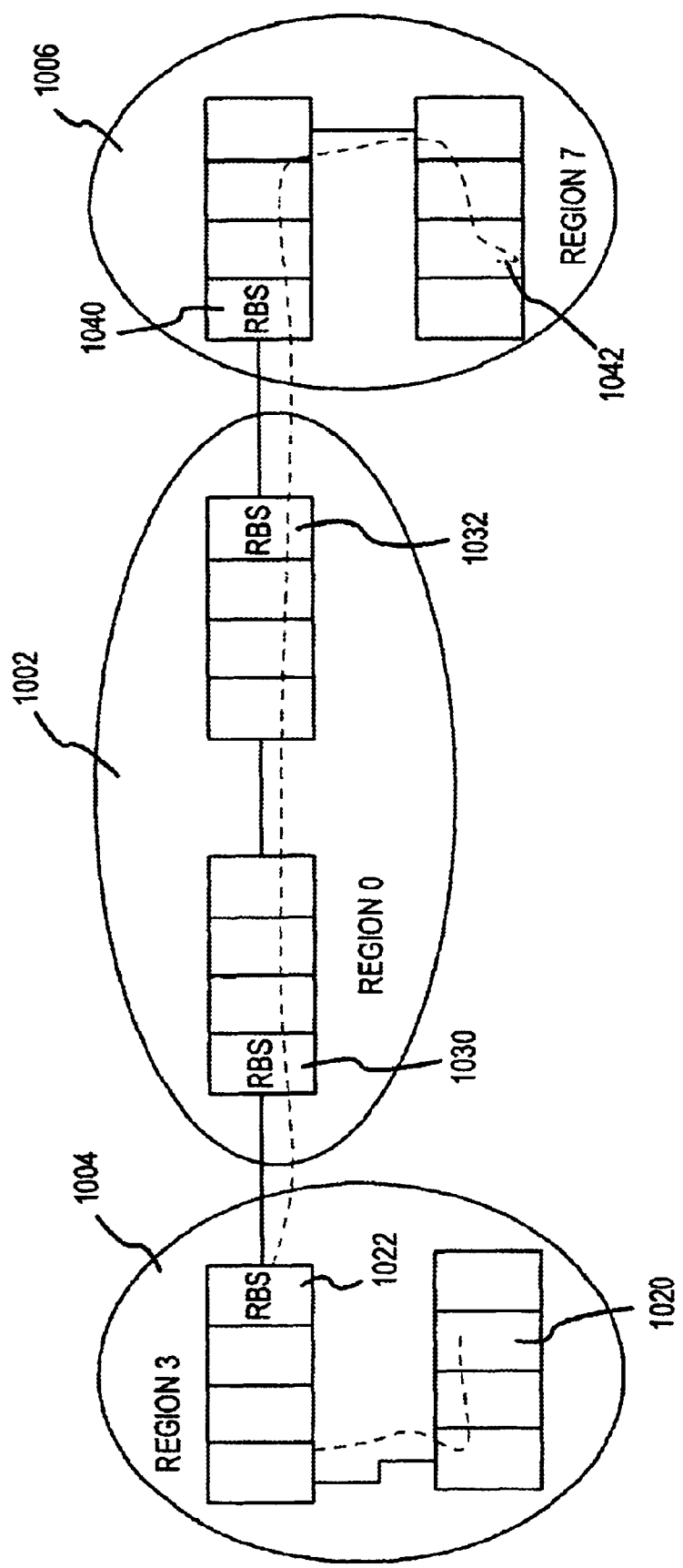
FIG. 10 shows an exemplary network depicting the flow of information from one node to another node across a backbone region.

By way of example, FIG. 10 shows the communication between two nodes that are in two different regions. To send a packet to a node in region 1006, source 1020 in region 1004 sends the packet to RBS 1022 in Region 1004. RBS 1022 sends the packet to RBS 1030 in backbone region 1002, which sends the packet to RBS 1032 that is connected to RBS 1040 of region 1006. RBS 1040 in region 1006 then sends the packet to destination 1042 in its region.

Any particular RBS knows the region topology that it is connected to, and also may know the topology of the backbone. It does not forward its region topology information into the backbone, and it does not forward the backbone topology into its region. Thus, any changes in region topology are contained within the region. Similarly any changes in backbone topology are contained within the backbone.

This RBS scheme enables two nodes to communicate across regions using unicast packets or region specific broadcast packets only. In a preferred embodiment, RBS does not forward broadcast packets addressed to all nodes in all regions from a region to backbone to avoid broadcast storms in global network. RBS does not forward broadcast packets from one region to another region.

Configuration Options

In the preferred embodiment, the maximum number of regions in an IEN HTSP network is 253. This total includes one global backbone region plus m number of sub-backbone regions and n number of stub regions, where the sum of the sub-backbone and stub regions is less than or equal to 252.

The maximum number of nodes per region in the preferred embodiment is 65,533. In practice, the number should not exceed 500 without giving special consideration to network convergence time. While the routing protocol can address a larger number of nodes per region, it becomes impractical to convey this much routing information without impacting the flow of data across slower WAN links.

IENView Configuration Options

The following are options in IENView that are configurable for HTSP.

| | |
|---|---|
| Trigger Update Interval | This interval is used whenever there is a change in the router's database. The router waits the time allotted before it sends the database. |
| Route Update Table Interval | This is the time that the router waits before it sends periodic route table. |
| Max Hop | This is the maximum number of hops a packet can traverse. This value should be equal to the maximum distance in a network. |
| Hello Interval | This is the time that the router waits before it sends a hello packet. |
| Status Update Interval | This the time that the router waits before it sends its link status (up/down) alarm to IENview. |
| Link Cost | This is the cost to reach the adjacent node. This value is used in computing the shortest path. |
| Network Icon ID | The router uses the ID to indicate to IENView that it is connected to a particular network cloud. This is not valid for point-to-point links. |
| Region Type | The region type is transit, stub, sub-backbone or global backbone, based on the network configuration. |
| Node Type | The node type is transit, stub, or concentrator, based on the network configuration |
| Serial Number | This is the unique serial number used to identify a router port within an HTSP network. This is the combination of the bus address and the CU address. |
| HTSP Message Formats | This section illustrates the message formats used by the HTSP protocol. |

HTSP Header

In the preferred embodiment, the HTSP header is 14 bytes long. It is placed after the Medium Access Layer header and before the packet data. The Region, Node, and Port addressing for both the destination and source are held within the HTSP header, which has the following structure:

| | |
|---|---|
| Payload Type | 1 byte |
| Option | 1 byte |
| Hop Limits | 1 byte |
| Protocol Type | 1 byte |
| Payload Length | 2 bytes |
| Destination Address | 4 bytes |
| Source Address | 4 bytes |

Payload Type

This field indicates the type of payload that follows after the HTSP header. It is 8 bits long. The valid Payload type values are:

| | |
|---|---|
| F0 = | Application Message (HTSP) |
| F8 = | Network Management Message |
| FA = | Hybrid Transport Switching Protocol Message |
| FB = | Application Broadcast Message |

Options

This field provides an indication of the segmentation, compression, encryption and HTSP address type and the presence of HTSP header extension. It is an 8 bit value as so:

| | | |
|---|---|---|
| Bit 0–3: | Reserved | |
| Bit 4: | 0 = No Route Trace header | 1 = Route Trace Header |
| Bit 7: | 0 = No Header Extension | 1 = Header Extension |

Hop Limit

The Hop count value represents the number of hops the packet can make before being discarded. The source node set the initial hop limit value and every switch interface decrement hop limit. Packets are discarded when this value reaches zero.

Protocol Type

This field indicates the type of application frame. It is an 8 bit long value. The valid types are defined in Protocol Type Value section. This field is valid only for Payload Type F0, F1, and FB.

Length

This field contains the length, in bytes, of the complete packet, which is the length of the HTSP header plus the length of the data.

Destination Address

This field contains the destination address of the Region, Node, Port ID. Sender node sets this address when sending a frame. Zero is not a valid destination address.

Source Address

This field contains the address of the source Region, Node, and Port address.

The following section summarizes the message structure for various types of communication modes and packet types in accordance with the present invention. Again, it will be appreciated that the sizes, structures, and data-types shown are merely exemplary, and that other schemes may be used.

Packet Type F0

Node to Node application message:

| HTSP Header | 14 bytes |
|---|---|
| Data | Variable |

Packet Type F8

Node to IENView Node message:

| HTSP Header | 14 bytes |
|---|---|
| NMS Data | Variable |

Packet Type FA

HTSP routing protocol messages as follows:

Hello

Hello packets are used to allow switch interfaces to discover each other's presence on the WAN and within a node. Hello packets are sent on WAN links to discover each other's identity, decide whether they are in the same routing region, and determine whether the other node and the link between them remains operational.

| HTSP Header | 14 Bytes |
|---|---|
| HTSP Type = 1 | 1 Byte |
| IEN Type | 1 Byte |
| Options | 1 Byte |
| Link Cost | 2 Bytes |
| Node Type | 1 Byte |
| Hello Interval | 1 Byte |
| DB Interval | 1 Byte |
| Reserved | 1 Byte |
| HTSP Header: | 14 byte long HTSP header with HTSP payload type. |
| HTSP Type: | 1 byte, HTSP type 1, Hello packet |
| IEN Type: | 1 byte, F0 IEN node, F8 NMS node |
| Options | 1 byte |
| | bit 0    1 = Link Up; 0 = Link Down |
| | bit 1    1 = Default Link |
| | bit 2    1 = Back-up NMS |
| | bit 3    1 = Master NMS |
| | bit 4 to 7    NMS ID (0-F) if it is IENView = 3 |
| Link Cost: | 2 bytes, cost of the link connection between the node and the neighbor node. |
| Node Type: | xxxx = region    xxxx = node |
| | xx01 = stub    xx01 = stub |
| | xx10 = transit    xx10 = concentrator |
| | xx11 = backbone    xx11 = transit |
| Hello Interval: | 1 byte long, hello interval of the packet |
| DB Interval: | 1 byte long, DB interval of the packet |
| Reserved: | 1 byte long, reserved |

IENView Node DNCP Message

This DNCP (Dynamic NodeID Configuration protocol), i.e. DNCP, is used to configure IEN Node ID. Each Node within a region must have a unique ID to communicate to other node on the network. When a node is installed, the switch (WAN) interface uses this protocol to communicate with Network Management Node to get its unique Node ID.

| HTSP Header | 14 byte |
|---|---|
| HTSP Type = 4 | 1 byte |
| Message Type | 1 byte |
| Hop Count | 1 byte |
| Client's ID | 4 bytes |
| Client's Region ID | 1 byte |
| Client's Node ID | 2 bytes |
| Client's IP Address | 4 byte [if present] |
| Node Type | 1 byte |
| HTSP Header: | 14 byte, HTSP header with HTSP payload type. |
| HTSP Type: | 1 byte, HTSP type 4, DNCP packet (BOOTP or "bootstrap protocol") |
| Message Type: | 1 byte,    01 = Request frame |
| | 02 = Reply frame |
| Hop Count: | 1 byte. The Hop count value represents the number of hops the packet can make before being discarded. The source node set the initial hop limit value and every switch interface decrement hop limit. Packets are discarded when this value reaches zero. |
| Client's ID: | 4 bytes, Client's unique ID. This unique ID is set by the combination CU and bus address switches. This setting must be unique within a region. Filled in by client (IEN) and returned by IENView to match request with the responses it generates. |
| Client's Region ID: | 1 bytes, Filled in by IENView in response message. |
| Client's Node ID | 2 bytes, Filled in by IENView in response message. |
| Client's IP Address: | 4 bytes, Filled in by IENView in response message. Applicable for LAN card communication with IENView. |
| Node Type: | 4 bytes, Filled in by IENView in response message. Applicable for LAN card communication with IENView. |

Packet Type FB

Node to Node Application Broadcast message:

This frame format is used to broadcast LAN application frames between nodes.

| HTSP Header | 14 bytes |
|---|---|
| Protocol Specific Broadcast Data | Variable Length |
| End Data | 1 byte (Hex FF) |

Database Packet Format

After the HTSP header, the database packet header format is as follows

Database Packet Header Type 1

| | |
|---|---|
| HTSP Type | 1 Byte |
| Command | 1 Byte |
| Number of Advertisements | 2 Bytes |
| Version | 1 Byte |
| Type = 1 | 1 Byte |
| Number of Entries | 2 Bytes |
| Database Info. Header | Database Information Header |

HTSP Type: 2

Command: 6 for Periodic Updates, 2 for Trigger Updates

Number of Advertisements: Number of different types of advertisements in the packet. It is always 1.

Version: Version of the database packet format. It is 2

Type: Type of the advertisement: Type 1

Number of Entries: Number of entries in the packet

Type 1 Advertisements

| | |
|---|---|
| Destination Node ID | 2 Bytes |
| Cost | 2 Bytes |
| Hops | 1 Byte |
| Option | 1 Byte |

Destination Node ID: It describes the Node ID

| | |
|---|---|
| Cost: | Cost to reach the Destination Node ID |
| Hops: | Hops to reach the Destination Node ID |
| Option: | Options about the Destination Node ID |
| xxxx-xxx1: | The destination is IENView |
| xxxx-xx1x: | The destination is RBN. |

Database Packet Header Type 0

| | |
|---|---|
| HTSP type | 1 Byte |
| Command | 1 Byte |
| Number of Advertisements | 2 Bytes |
| Version | 1 Byte |
| Type = 0 | 1 Byte |
| Number of Entries | 2 Bytes |
| Database Info. Header | Database Information Header |
| HTSP Type: | 2 |
| Command: | 6 for Periodic Updates, 2 for Trigger Updates |
| Number of Advertisements: | It is always 0. It is ignored in this packet. |
| Version: | Current Version of the database packet format. It is 2. |
| Type: | Type of the advertisement: Type 0 |
| Number of Entries: | Number of entries in the packet. |

After the database packet header, the following header (database information header) follows:

Database Information Header

| | |
|---|---|
| Length | 2 Bytes |
| Checksum | 2 Bytes |
| Reserved | 4 Bytes |
| Database Entries | Database Entries |

| | |
|---|---|
| Length: | Length of the database packet starting from the 'Length' field in the above header till the end of the packet. |
| Checksum: | Checksum of the database packet starting from 'Length' field in the above header till the end of the packet. |
| Reserved: | 0 |

Database Entry Information Header

After the above Database Information Header, the Database Advertisements follow. Each Database Advertisement contains Database Entry Information Header and the Database Entry as described.

| | |
|---|---|
| Type | 1 Byte |
| Source Port | 1 Byte |
| Reserved | 2 Bytes |
| Database Advertisements | Database Advertisements |
| Type: | Describes the type of the database entry that follows. Current possible values are 1, 2 and 3 |
| Source Port: | This is valid only when the database packet is received from the BUS port. When a router with multiple ports sends an entry, it uses this port id to let the neighbor know on which port the entry was learned. |
| Reserved: | Currently not used. It must be set to 0. |

Sub-Type 1 Advertisements

| | |
|---|---|
| Destination Node ID | 2 Bytes |
| Cost | 2 Bytes |
| Hops | 1 Byte |
| Option | 1 Byte |
| Destination Node ID: | It describes the Node ID |
| Cost: | Cost to reach the Destination Node ID |
| Hops: | Hops to reach the Destination Node ID |
| Option: | Options about the Destination Node ID |
| xxxx-xxx1: | The destination is IENView |
| xxxx-xx1x: | The destination is RBN. |

Sub-Type 2 Advertisements

| | |
|---|---|
| Destination Node ID | 4 bytes |
| RBS | 4 bytes |
| Cost | 2 hops |
| Option | 1 byte |
| Entry Type | 1 byte |
| Reserved | 2 bytes |
| Destination Node ID: | e.g., 412222FF, 41FFFFFF, FFFFFFFF. [4 bytes] |
| RBS: | The Region border switch that can reach the destination node id. |
| Cost: | Cost to reach the Destination Node ID |
| Entry type: | Entry type of the advertisement. |
| 1 | Default –0xFFFFFFFF (to everyone) |
| 2 | Specific Region e.g., 0x41FFFFFF (to everyone in region 41) |
| 3 | Specific to a Node - e.g., 0x412222FF (to node 412222) |
| 4 | IENView address - e.g., 0x40999900 |
| Reserved: | For Future Use [2 Bytes] |

The HTSP Header Extension

The choice of a fixed size HTSP header followed by a set of optional extension headers was chosen as a compromise between generality and efficiency. The extension provides supports for such functions as fragmentation, source routing information and additional options. The header extension area added as needed. This makes the header efficient and flexible, because most frames do not use all mechanisms.

| HTSP Extension Type | 1 byte |
|---|---|
| Next Header flag | 1 byte |

Extension Header Type:
01—Fragmentation frame
02—Trace Route information
Fragmentation Header
The Fragmentation is done end-to-end; no fragmentation should occur in intermediate nodes.

| Flag + Fragment off | 2 bytes |
|---|---|
| Identification | 2 bytes |
| Data | Variable |

Fragment offset: 14 bits. This field indicates where in the datagram this fragment belongs. The first fragment has offset zero.
Flags: 2 bits
01—first in chain
00—middle in chain
10—last in chain
Identification: 16 bits
An identification value assigned by the sender to aid assembling the fragments of a datagram.
HTM Trace Route
HTM (hybrid transport mode) Trace route feature used to propagate broadcast/Unicast packets through the network. The special handling of this packet required by a HTSP switch node is described below.

| Cost | 2 bytes |
|---|---|
| Trace Route pointer | 1 byte |
| Trace Route Length | 1 byte (# of entry) |
| Trace Route Data | # of entry X 4 byte (4 byte entry size) |
| Data | Variable |

As broadcast frame is propagated from the source network to another distant network across the nodes, the address of each region+node+port is stored in the "Route Trace Area". Each switch node should perform following tasks:

The "Trace Route Pointer" field is examined; this value indicates the number of HTSP switch node traversed by the packet so far. This field also indicates how many HTSP address fields in the packet have been filled in. If the value is equal to or greater than the "Trace Route Length", the packet is discarded, otherwise the system proceeds to the next step.

The switch node compares each HTSP address entry in the packet to the switch node's own address. If a match is found, the packet is discarded to prevent multiple traversals of the same segment; if no match is found, proceed to the next step.

The switch node places its own address to the next available address field. The offset of this field is calculated as 4* n bytes past the end of the HTSP header, where n is the value of the "Trace Route Pointer" field. The switch node increments the "Trace Route Pointer" field and compares with the "Trace Route Length". If "Trace Route Pointer" is equal or greater than the "Trace Route Length" the packet is discarded otherwise transmit the packet.

HTSP on Frame Relay

In a frame relay network, every router may not have a virtual circuit to every other router that is connected to the frame relay cloud. Usually, a central router has a virtual circuit to every other router in the cloud. A remote router has a virtual circuit to the central router and may have virtual circuits to other remote routers. When a central router receives a broadcast from a remote, it has to send the packet to all other remotes since the source of the packet may not have virtual circuits to every other remote. A frame relay interface can be configured as central or remote to avoid the retransmission of broadcasts in to the cloud.

HTSP considers a frame relay interface as a Point-to-Multipoint interface. When frame relay interface is configured as a central, if HTSP switch receives a broadcast on a virtual circuit, then the broadcast packet will be sent on every other virtual circuit. If the frame relay interface is configured as a remote, then the HTSP switch does not send a broadcast packet back into the frame relay cloud.

HTSP switch sends out BOOTP requests, periodic hellos and database updates as broadcast packets. Upon receiving a broadcast packet from HTSP, the frame relay software sends it on every active virtual circuit. All HTSP hellos, database and trigger updates are sent with a hop count of 1 so that these packets are received by other switches and not forwarded to anyone else. All HTSP packets are encapsulated in frame relay packets as shown below. The 10-byte frame relay header contains RFC 1490 header that identifies that the data after the RFC 1490 header is an HTSP packet.

On a Frame Relay network, the HTSP packet is encapsulated in RFC 1490 frame as shown below. The RFC 1490 specification is hereby incorporated by reference.

| Q.922 Address | 2 bytes |
|---|---|
| Control 0x03 pad 00 | 2 bytes |
| NLPID (Network Layer Protocol ID) 0x80 | 2 bytes |
| OID (Object ID) 0x00 | |
| 0x40 0xEF | 2 bytes |
| 0x880F | 2 bytes |
| HTSP | 14 bytes |
| Data | Variable |

HTSP on the LAN

In a local area network, a router can send a broadcast packet that can be received by every other router that is connected to that network. Unlike in frame relay network, when a router receives a broadcast packet from a LAN, it does not send back the broadcast packet back onto the LAN. HTSP considers a LAN interface as multi-access interface. All HTSP broadcast packets are sent as MAC layer broadcast packets on the LAN. All HTSP specific such as BOOTP requests, hellos and database, trigger updates are sent as MAC layer broadcast packets on the LAN. All HTSP unicast packets are sent as MAC layer unicast packets to a specific MAC address. On an Ethernet LAN, the HTSP packet is encapsulated in MAC frame as shown below:

| Destination MAC Address | 6 bytes |
|---|---|
| Source MAC Address | 6 bytes |
| Protocol Identifier | 2 bytes |
| HTSP header | 14 bytes |
| Data | Variable |

-continued

| | |
|---|---|
| Destination MAC Address: | 0xFF-FF-FF-FF-FF-FF for broadcast packets. Otherwise, Destination MAC address of the HTSP Switch. |
| Source MAC Address: | Source MAC address of the HTSP Switch. |
| Protocol Identifier: | 0x8810 for all HTSP packets. |

On a Token Ring LAN, the HTSP packet is encapsulated in MAC frame as shown below:

| | |
|---|---|
| AC-FC | 2 bytes |
| Destination MAC Address | 6 bytes |
| Source MAC Address | 6 bytes |
| DSAP-SSAP (destination service access point-source service access point) | 2 bytes |
| Control | 1 byte |
| Unused | 3 bytes |
| Protocol Identifier | 2 bytes |
| HTSP Header | 14 bytes |
| Data | Variable |
| AC-FC: | Access Control/Frame Control are always set to 0x1040 |
| Destination MAC Address: | 0xFF-FF-FF-FF-FF-FF for all HTSP broadcast packets. Otherwise, Destination MAC Address of the HTSP Switch. |
| Source MAC Address: | Source MAC address of the HTSP Switch. |
| DSAP-SSAP: | 0xAAAA (to indicate SNAP format) |
| Control: | 0x03 |
| Unused: | 00-00-00 |
| Protocol Identifier: | 0x8810 to indicate HTSP packets. |

IENView Frame Format on the LAN with IP/UDP (Internet Protocol/User Datagram Protocol)

| MAC Hdr | IP/UDP Hdr | HTSP | Data |
|---|---|---|---|
| 14 | 28 | 14 | Variable |

Frame Format on the Bus

| Bus Hdr | HTSP | Data |
|---|---|---|
| 3 | 14 | Variable |

Adjacent Node ID Information (with Link Up Alarm)

| Alarm Header Alarm code 6E/6F | |
|---|---|
| Field type 'N' | 1 byte |
| Field length = 00,04 | 2 bytes |
| Region + Node + Port | 4 bytes |

-continued

| Alarm Header Alarm code 6E/6F | |
|---|---|
| Link Type | 1 byte |
| Spare | 1 byte |

In accordance with the above, a method of transmitting data over a network has been described which employs a hybrid transport method incorporating both link state and distance vector principles.

Although the invention has been described herein in conjunction with the appended drawings, those skilled in the art will appreciate that the scope of the invention is not so limited. Modifications in the selection, design, and arrangement of the various components and steps discussed herein may be made without departing from the scope of the invention as set forth in the appended claims.

What is claimed is:

1. A network for use in routing data from a source node having an associated source address to a destination node having an associated destination address, said network comprising:

a plurality of nodes which route and store said data, each of said nodes being associated with a node address, wherein said nodes are selectable from the types of stub, transit and region border;

a number of ports contained within each of said nodes, each of said ports being associated with a port address;

a plurality of regions, each of said regions comprising a number of said nodes and each region being associated with a region address of a minimum bit length;

a switching element which routes said data from one of said plurality of regions to another of said plurality of regions based on said region addresses wherein said data includes an addressing scheme in which said source address comprises bit fields for a source port address, a source node address and a source region address and said destination address comprises bit fields for a destination port address, a destination node address and a destination region address.

2. The network of claim 1, wherein said routed data is transmitted at predetermined intervals, and wherein if said routed data is not forthcoming after a predetermined number of said predetermined intervals, a table is updated to reflect that a node from which said routed data is being transmitted is unavailable for routing said data.

3. The network of claim 1, wherein said exchanged data includes status data which is contained within a small amount of memory and transmitted at frequent intervals.

4. The network of claim 1, further including a link table associated with a source node, wherein said link table identifies how said source node is linked to other said nodes within said region and other said regions.

5. The network of claim 4, wherein said link table further includes link cost.

* * * * *